United States Patent [19]
Briel et al.

[11] Patent Number: 6,119,183
[45] Date of Patent: Sep. 12, 2000

[54] MULTI-PORT SWITCHING SYSTEM AND METHOD FOR A COMPUTER BUS

[75] Inventors: Mark C. Briel, Oakdale; P. Frank Wynhamer, Fremont, both of Calif.

[73] Assignee: Storage Technology Corporation, Louisville, Colo.

[21] Appl. No.: 08/252,896

[22] Filed: Jun. 2, 1994

[51] Int. Cl.[7] .................................................. G06F 13/00
[52] U.S. Cl. ...................... 710/101; 710/100; 710/107
[58] Field of Search ..................................... 395/250, 325, 395/275, 575, 725; 340/870.11; 710/101, 100, 107

[56] References Cited

PUBLICATIONS

Bigelo, Stephen J., How to Troubleshoot SCSI Devices—Inside SCSI, The PC Troubleshooter, Special Report, Published for Landmark Research International Corp., 1993, Rev 931202–A, pp. 1–7.

*Primary Examiner*—Zarni Maung
*Assistant Examiner*—Saleh Najjar
*Attorney, Agent, or Firm*—Brooks & Kushman P.C.

[57] ABSTRACT

A multi-port switching system and method for a computer bus allows for selective coupling of a number of bus initiator devices to at least one bus target device to simulate a dual-ported interface to the bus target device. By use of a number of switching circuits corresponding with the bus initiator busses, a single-ported bus target device may be utilized in applications where dual-ported or greater interfaces are required. The multi-port switching system and method utilizes a low-cost hardware based design which adds minimal overhead to the operation of the computer bus.

16 Claims, 11 Drawing Sheets

```
SCSI INITIATOR CONNECTOR                    SCSI TARGET CONNECTOR
(DIFFERENTIAL)                              (SINGLE-ENDED)

64 ──── GND                                 50 ──── SI/O
  30 ──── GND                                 49 ──── GND
  63 ──── -I/O                                48 ──── SREQ
  29 ──── +I/O                                47 ──── GND
  62 ──── -REQ                                46 ──── SC/D
  28 ──── +REQ                                45 ──── GND
  61 ──── -C/D                                44 ──── SSEL
  27 ──── +C/D                                43 ──── GND
  60 ──── -SEL                                42 ──── SMSG
  26 ──── +SEL                                41 ──── GND
  59 ──── -MSG                                40 ──── SRST
  25 ──── +MSG                                39 ──── GND
  58 ──── -RST                                38 ──── SACK
  24 ──── +RST                                37 ──── GND
  57 ──── -ACK                                36 ──── SBSY
  23 ──── +ACK                                35 ──── GND
  56 ──── -BSY                                34 ──── GND
  22 ──── +BSY                                33 ──── GND
  55 ──── GND                                 32 ──── SATN
  21 ──── GND                                 31 ──── GND
  54 ──── -ATN                                30 ──── GND
  20 ──── +ATN           58                   29 ──── GND
  53 ──── NC                      60          28 ──── NC
  19 ──── NC                                  27 ──── NC
  52 ─┐                                       26 ────
  18 ─┤                                       25 ──── NC
  51 ─┼──── +V                                24 ──── NC
  17 ─┘                                       23 ──── NC
  50 ──── GND                                 22 ──── GND
  16 ──                                       21 ──── GND
  49 ──── -DBP                                20 ──── GND
  15 ──── +DBP                                19 ──── GND
  48 ──── -DB7                                18 ──── SDBP
  14 ──── +DB7                                17 ──── GND
  47 ──── -DB6                                16 ──── SDB7
  13 ──── +DB6                                15 ──── GND
  46 ──── -DB5                                14 ──── SDB6
  12 ──── +DB5                                13 ──── GND
  45 ──── -DB4    Fig.3A                      12 ──── SDB5
  11 ──── +DB4                                11 ──── GND
  44 ──── -DB3                                10 ──── SDB4
  10 ──── +DB3            Fig.3B              09 ──── GND
  43 ──── -DB2                                08 ──── SDB3
  09 ──── +DB2                                07 ──── GND
  42 ──── -DB1                                06 ──── SDB2
  08 ──── +DB1                                05 ──── GND
  41 ──── -DB0                                04 ──── SDB1
  07 ──── +DB0                                03 ──── GND
  40 ──── GND                                 02 ──── SDB0
  06 ──── GND                                 01 ──── PRTBUSY
```

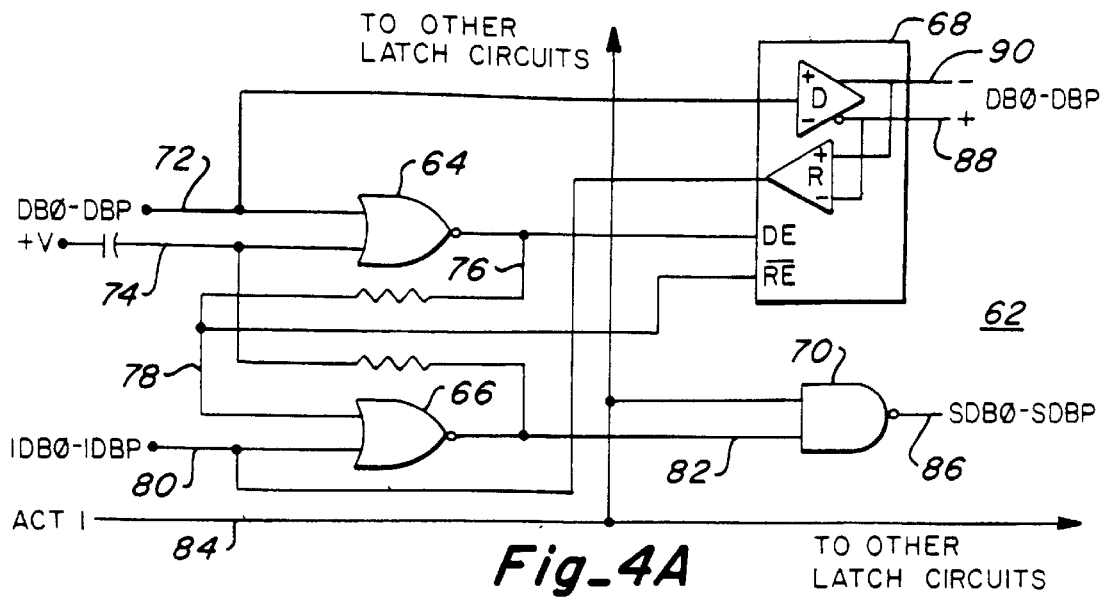
Fig_4A
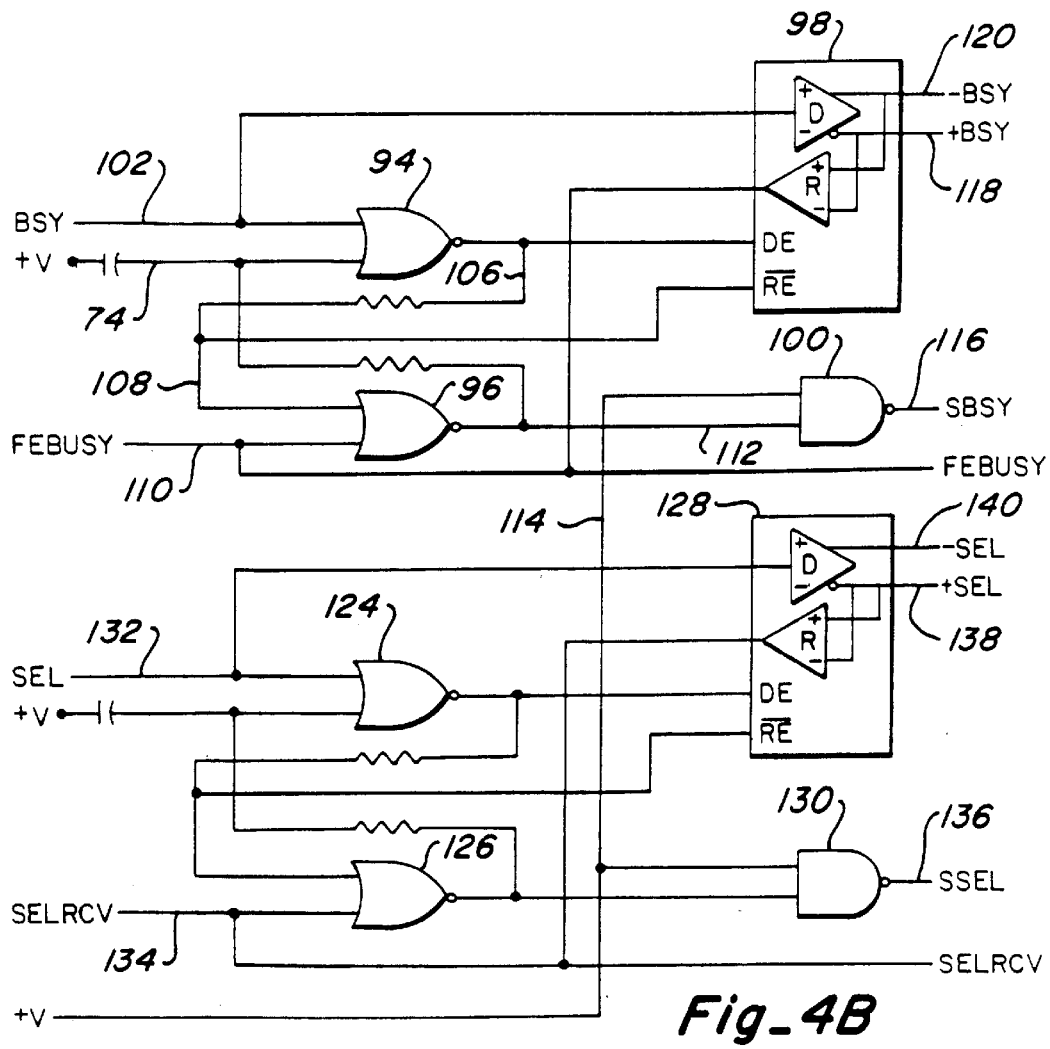
Fig_4B

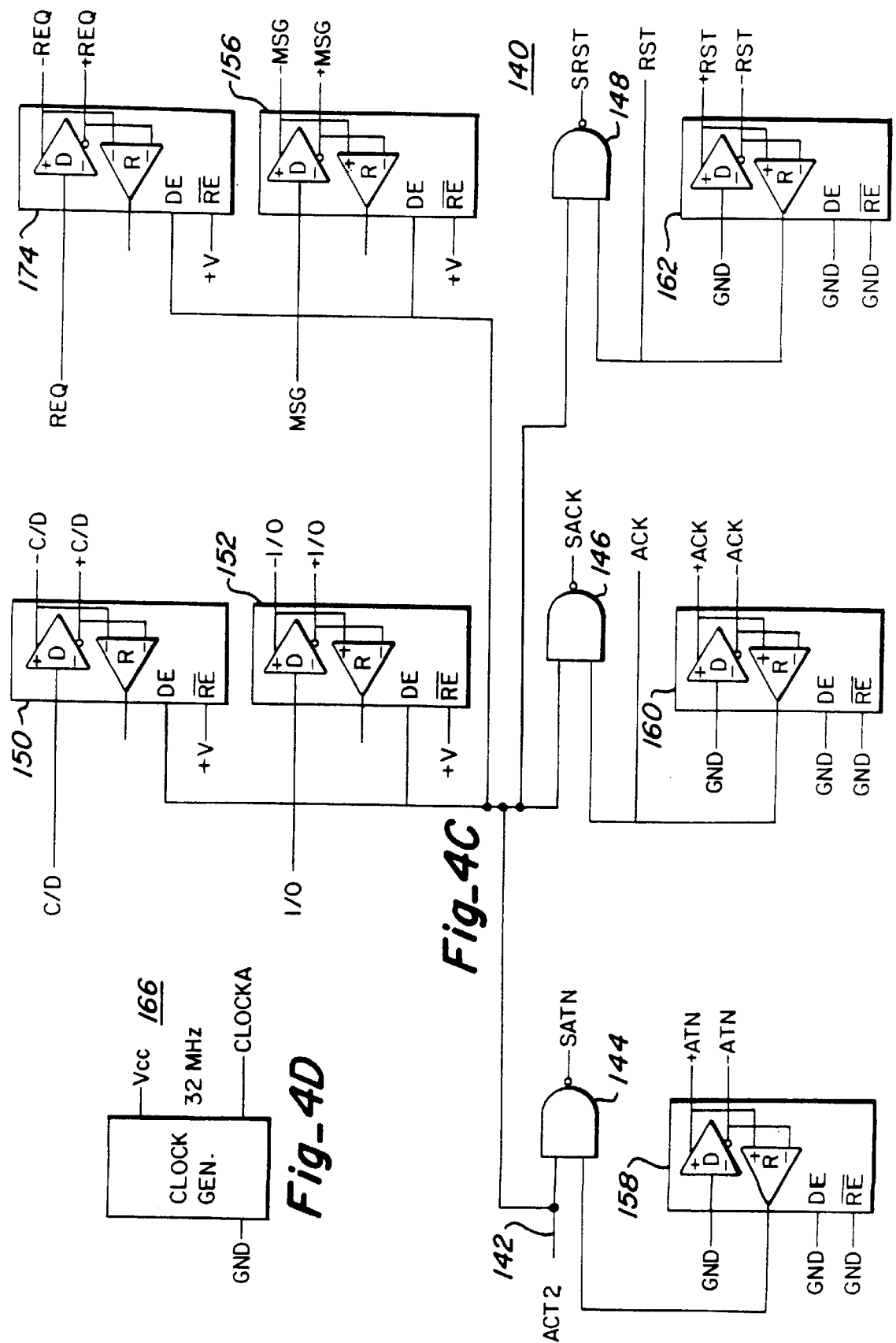

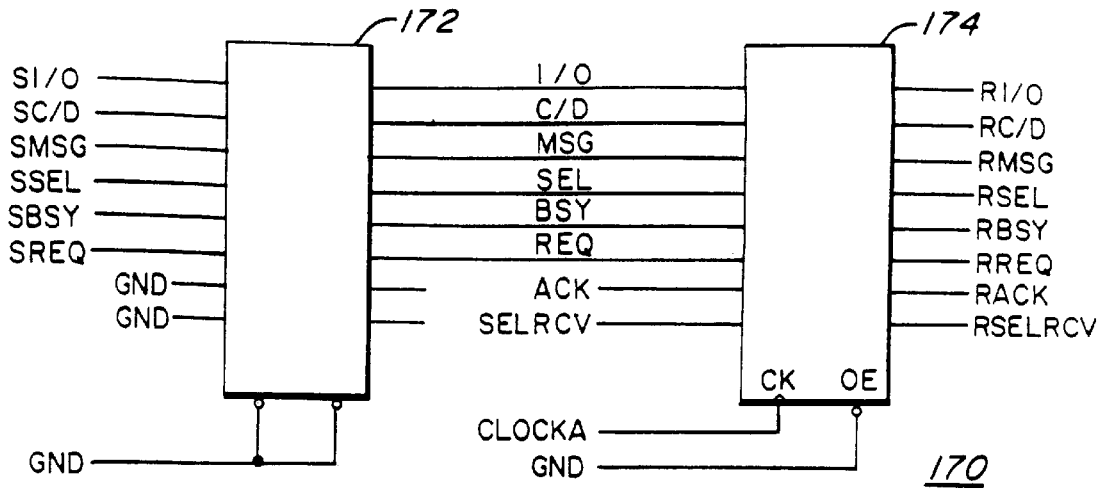
Fig_4E
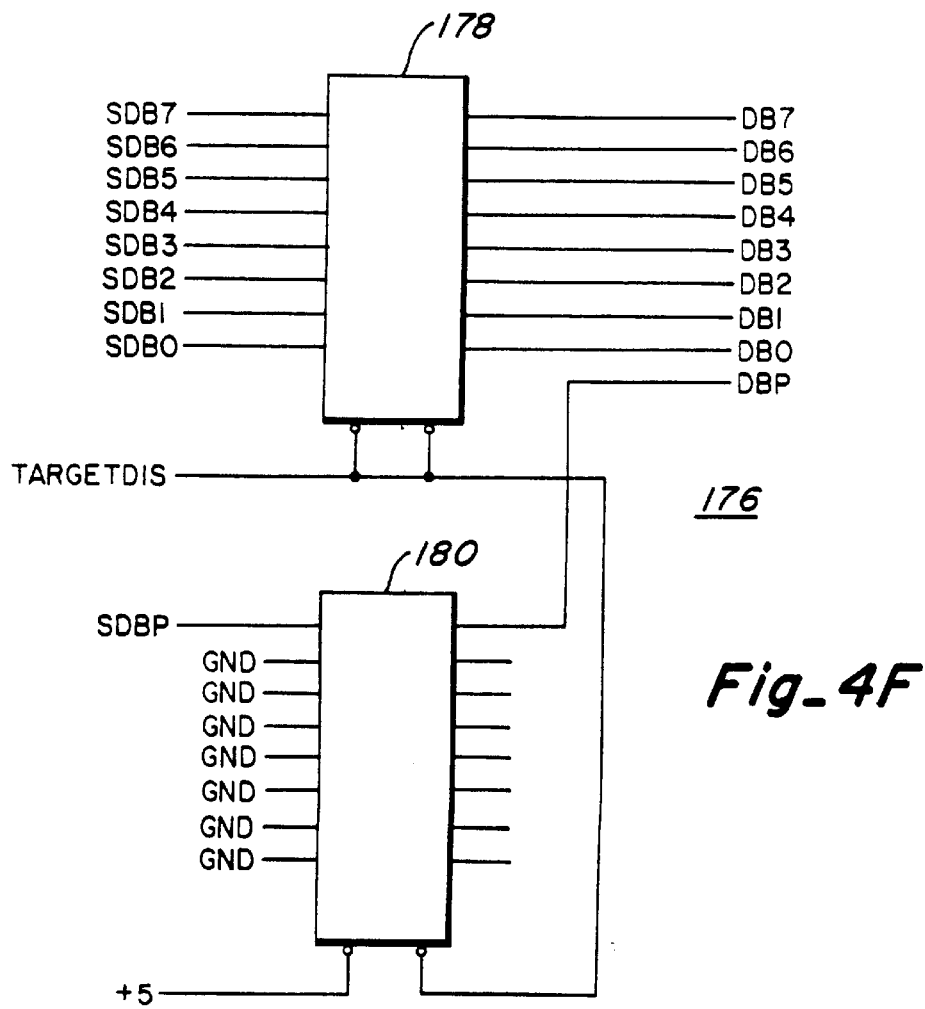
Fig_4F

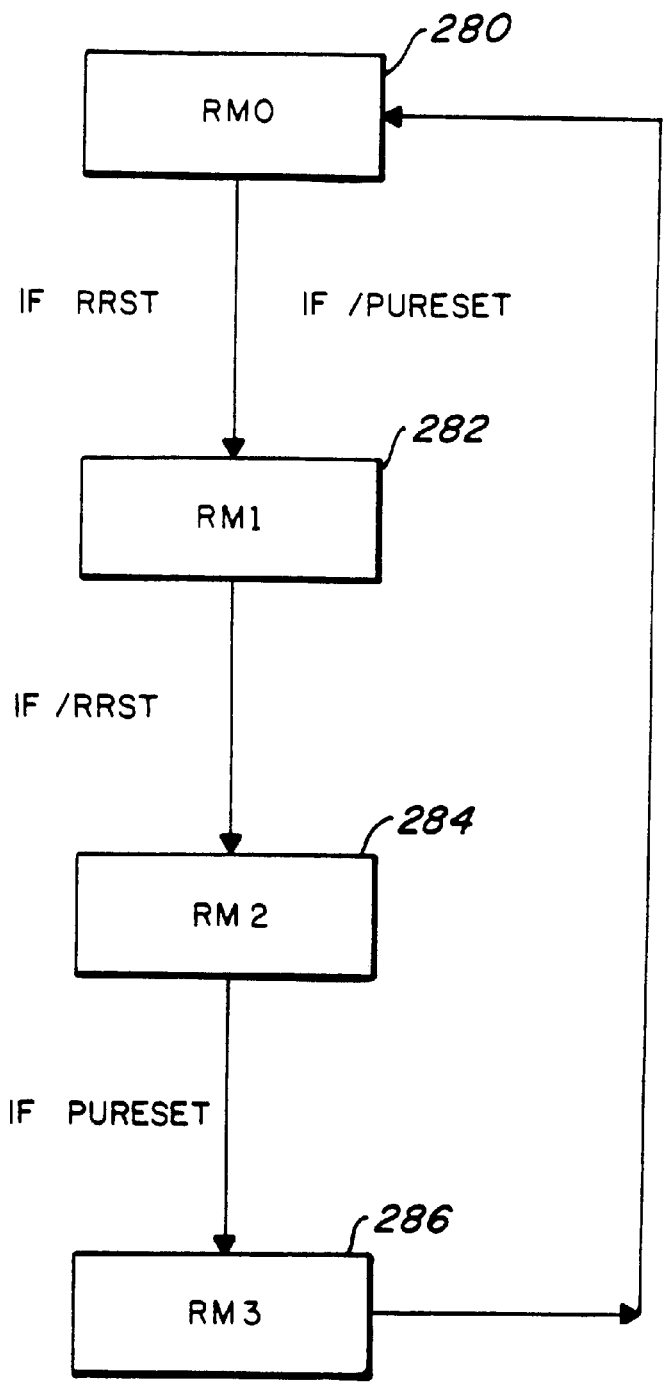
Fig_7

MULTI-PORT SWITCHING SYSTEM AND METHOD FOR A COMPUTER BUS

BACKGROUND OF THE INVENTION

The present invention relates, in general, to a multi-port switching system and method for a computer bus. More particularly, the present invention relates to a multi-port switching system and method for a computer bus of particular utility with the Small Computer System Interface ("SCSI") or other daisy chained buses.

The SCSI bus is a parallel, multi-master input/output ("I/O") bus which was adopted as an ANSI standard in 1986. Eight-bit SCSI can support up to eight devices simultaneously and a 16-bit SCSI-2 bus can support as many as sixteen devices. However, there must always be at least one initiator device and one target device in the system. Typically, a SCSI host adaptor is the initiator and all other devices (such as various computer mass storage disk drives) are generally the targets. Nevertheless, systems may also have multiple initiators and multiple targets.

An initiator device starts communication with a target device when something has to be accomplished by the target device, which then responds as directed to the initiator's commands. Notwithstanding, this "master/slave" relationship is not a simple one-way arrangement and an initiator may also become a target at some points in the data transfer cycle with the target becoming the initiator at other points.

Physically, the SCSI bus is an organization of dedicated wires and terminations wherein each wire has its own identified function and purpose. Moreover, the SCSI bus also consists of a defined command set or limited set of instructions, which allow the computer and peripheral to communicate over the physical bus.

As a system level interface, SCSI requires an operating "hand-shaking protocol" which organizes the transfer of data from a sending to a requesting point. Typically, there are three hand-shaking protocols, those being, asynchronous, synchronous and fast synchronous. With the asynchronous protocol, each byte must be requested and acknowledged before the next byte of information can be transferred. This results in a reliable, but relatively slow bus performance. On the other hand, synchronous and fast synchronous operations ignore the request/acknowledge hand-shake for data transfer only. This allows for faster operation than with the asynchronous protocol, but a certain fixed amount of time delay, or offset, must be allowed for request and acknowledge effects.

Additionally, there are two primary wiring techniques for the SCSI bus, that is, single-ended and differential wiring. The single-ended wiring technique utilizes a single wire to carry a particular designated signal from the initiator device to the target device. Each signal requires only one wire and a common ground or return provides the reference for all of the single-ended signals. Because the single-ended circuitry is susceptible to noise, single-ended cabling is generally limited to about 6 meters at data transfer speeds of approximately 5 Mhz or less.

On the other hand, the differential wiring approach utilizes a pair of complementary wires for each signal instead of a single wire referenced to a common ground. The differential signal offers superior noise immunity because it does not rely on a common ground thereby allowing the use of cables of up to 25 meters and higher speed operation of up to about 10 Mhz. An array of pull-up resistors on the cable help to insure signal integrity with terminating resistors at each end of the cable to maintain acceptable signal levels. Differential SCSI wiring is somewhat-more complicated than that experienced with the single-ended approach.

SCSI peripheral devices are also characterized as having either dual-ported or single-ported interfaces as well. However, although SCSI is commonly used as a primary I/O bus in many computer designs, there are still relatively few SCSI peripherals, such as Winchester, "fixed", "rigid" or hard disk drives (or other target devices), available with a dual-ported interface to allow more than one initiator device to be cabled directly to a given peripheral. In fact, many disk drive manufacturers are slow to provide devices including such a dual-ported feature due to the inherently higher cost (and more limited demand) than is encountered with the more commonly available single-ported versions. Moreover when a dual-ported interface to a disk drive is made available, it generally lags the release of the single-ported version by six months to one year. Therefore, due to the limited availability of dual-ported disk drives, storage subsystem designs are generally driven to some extent by the availability of a particular dual-ported disk drive.

SUMMARY OF THE INVENTION

Disclosed herein is a multi-port switching system and method for a computer bus utilizing a number of switching circuits which can be connected to any single-ported target device to provide the equivalent of a dual-ported or greater interface thereto. The switching circuits utilized in the multi-port switching system and method of the present invention can be designed to add minimal overhead to the operation of the computer bus and allow for the use of multiple switching circuits for connection of up to n SCSI initiator busses to a single target device. The number of initiator busses, n, is limited only by the electrical characteristics of the target SCSI bus as defined in the ANSI specification. In conjunction with the SCSI bus, the minimum limitation on n is seven in all cases. Furthermore, more than one target device may be attached to these same initiator busses through additional switches. As a consequence, the present invention will allow the use of any single-ported target device in environments where a dual-ported device is otherwise required. Moreover, it allows the integration of the latest disk drive technology (generally incorporating only a single-ported design) into storage subsystems which would otherwise require a dual-ported device. Specifically provided herein is a multi-port switching system for a computer bus operative for selectively coupling n bus initiator devices to at least one bus target device wherein the switching system comprises a plurality of switching circuits, each of the switching circuits coupled between a subset of the n bus initiator devices and the at least one bus target device. A corresponding one of the switching circuits is responsive to a selected one of the n bus initiator devices for coupling the selected bus initiator device to the at least one bus target device and generating a busy signal to a remainder of the other switching circuits while the selected one of the n bus initiator devices is coupled to the one bus target device. Each initiator bus may have one or more initiator devices coupled thereto in addition to configurations in which a single switching circuit is associated with a single initiator device.

Also disclosed herein is a switching circuit for a computer bus which comprises a bus initiator interface coupling the switching circuit to at least one bus initiator device. A bus target interface couples the switching circuit to a bus target device and a switch control logic subsystem is responsive to an externally supplied port busy signal for coupling the bus initiator interface to the bus target interface when the port busy signal is not asserted and isolating the bus initiator interface from the bus target interface when the port busy signal is asserted.

Also provided herein is a method for selectively coupling n bus initiator devices to at least one bus target device through a computer bus which comprises the steps of providing a plurality of switching circuits, each of the switching circuits being coupled between a subset of the n bus initiator devices and the bus target device. A selected one of the n bus initiator devices is coupled to the bus target device by enabling a corresponding one of the plurality of switching circuits. A busy signal is generated to a remainder of the other switching circuits while the selected one of the n bus initiator devices is operatively coupled to the bus target device.

BRIEF DESCRIPTION OF THE DRAWINGS

The foregoing and other features and objects of the present invention and the manner of attaining them, will become more apparent and the invention itself will be best understood by reference to the following description of a preferred embodiment taken in conjunction with the accompanying drawings wherein:

FIG. 3A illustrates a conventional differential SCSI initiator connector pin out and corresponding signals for use in conjunction with the bus initiator interface of the present invention;

FIG. 3B illustrates a conventional single-ended SCSI target connector pin out and corresponding signals for use in conjunction with the bus target interface of the present invention;

FIG. 4A is a detailed schematic diagram of a single latch circuit associated with a particular one of the data/parity lines of the SCSI bus forming a part of the direction control circuit of FIG. 2 and also including a corresponding transceiver and driver forming a part of the bus initiator and bus target interfaces thereof;

FIG. 4B is a detailed schematic diagram of a pair of latch circuits associated with the select and busy lines of the SCSI bus forming a part of the direction control circuit of FIG. 2 and also including a corresponding transceiver and driver forming a part of the bus initiator and bus target interfaces thereof;

FIG. 4C is a detailed schematic diagram of a number of latch circuits associated with the initiator-to-target control lines and target-to-initiator control lines of the SCSI bus forming portions of the bus initiator and bus target interfaces of the switching circuit of FIG. 2;

FIG. 4D is a schematic diagram of a simple oscillator circuit for providing the clock input signals to the switch control logic 28;

FIGS. 4E and 4F are detailed schematic diagrams of a number of receiver integrated circuits ("ICs") and an associated three-state device forming a portion of the receivers of the bus target interface of the switching circuit of FIG. 2;

FIG. 7 is a state diagram for the SCSI_RESET_DETECTION portion of the switch control logic state machine of the switching circuit illustrated in FIGS. 1 and 2.

DESCRIPTION OF A PREFERRED EMBODIMENT

Figure 1:
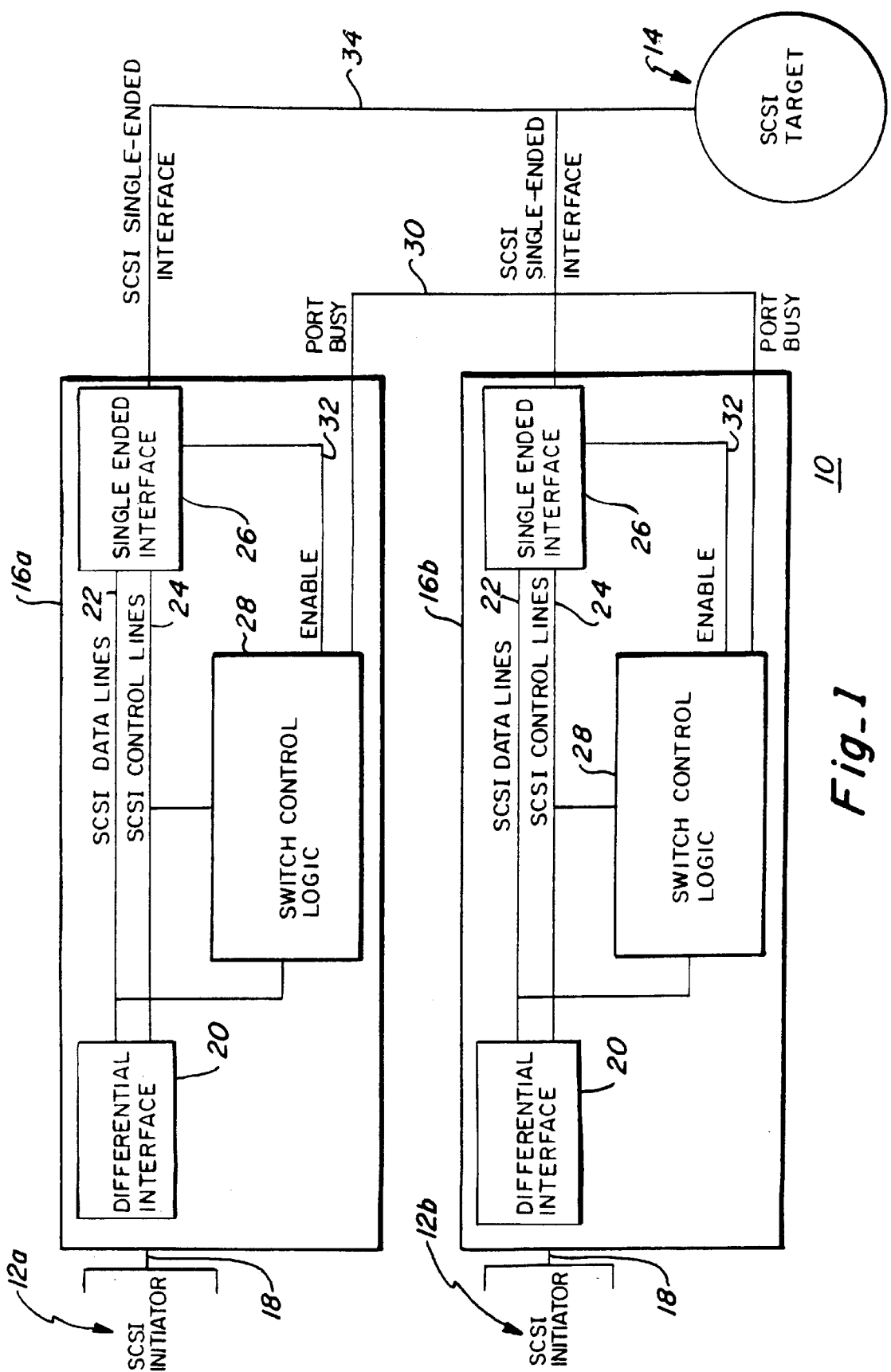
FIG. 1 is a simplified logic block diagram of a multi-port switching system for a computer bus (for example, the SCSI bus) incorporating a pair of switching circuits for selectively coupling a number of corresponding bus initiator devices to a single, single-ported bus target device such as a disk drive or other computer mass storage or peripheral device.

With reference to FIG. 1, a multi-port switching system 10 in accordance with the present invention is shown. Multi-port switching system 10 allows a number of bus initiator devices 12a and 12b to be selectively coupled to a single bus target device 14. The multi-port switching system 10 comprises a number of switching circuits 16a and 16b which may correspond to the number of bus initiator devices 12a and 12b, although each initiator bus 18 may have more than one bus initiator device 12 associated therewith. In the particular implementation shown, bus initiator devices 12a and 12b are coupled to a corresponding one of the switching circuits 16a and 16b respectively, by means of a bus 18. In a preferred embodiment, bus 18 may comprise a SCSI bus.

Within each of the switching circuits 16a and 16b, bus 18 is coupled to a bus initiator interface 20 as shown. Data lines 22 and control lines 24 couple the bus initiator interface 20 to a corresponding bus target interface 26 as well as providing data and control signal connections to the switch control logic 28. Switch control logic 28 provides a bi-directional port busy signal on port busy signal line 30 to any other switching circuits 16 as well as an enable signal on enable signal line 32 to its own bus target interface 26. A bus 34 connects the bus target interfaces 26 of the switching circuits 16a and 16b to the bus target device 14, which may in a preferred embodiment comprise a single-ported computer mass storage device, for example a disk drive, or other computer peripheral device supported by the various SCSI bus standards.

Figure 2:
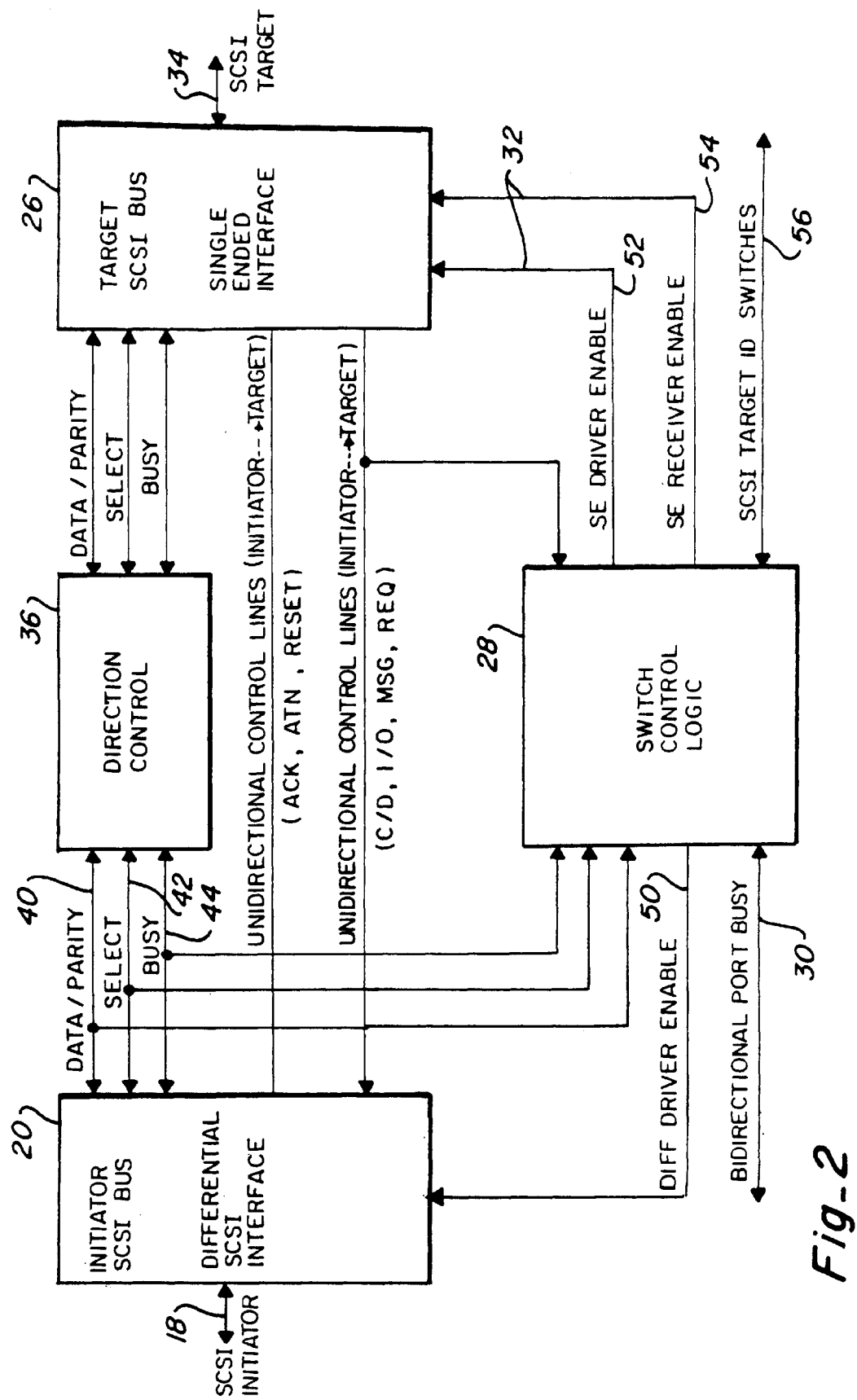
FIG. 2 is a more detailed logic block diagram of one of the switching circuits shown in FIG. 1 illustrating the use of, for example, a differential SCSI interface to the bus initiator device and a single-ended SCSI interface to the bus target device in conjunction with a switch control logic state machine and bus direction control circuit.

With reference additionally now to FIG. 2, a single one of the switching circuits 16 above described with respect to FIG. 1 is shown in more detail. The single switching circuit 16 shown couples bus 18 connected to one or more bus initiator devices (not shown) to bus 34 coupled to a bus target device 14 (also not shown). As previously described, the principal elements of switching circuit 16 comprise bus initiator interface 20 and bus target interface 26 in conjunction with switch control logic 28. As illustrated in more detail in this Figure, the switching circuit 16 also comprises a direction control circuit 36 comprising a number of latches for directional control of the various bi-directional SCSI signals and data lines. Particularly, direction control circuit 36 receives as inputs the bi-directional data/parity signal lines 40, the Select ("SEL") line 42 and Busy ("BSY") line 44 from the bus initiator interface 20 which also incorporates a number of transceivers (not shown) which will be more fully described hereinafter. The data/parity signal lines 40, the select line 42 and busy line 44 are also coupled between the direction control circuit 36 and the bus target interface 26 which also includes a number of receivers and drivers (not shown) which will also be more fully described hereinafter.

The data/parity signal lines 40 include eight data signals denominated DB0 through DB7 inclusive as well as a parity signal denominated DBP. When utilized in conjunction with a differential SCSI bus, the data/parity signal lines 40 include both complementary + and − data/parity signals while in conjunction with a single-ended SCSI bus, each data line and the parity signal line is referenced to a single common ground. In like manner, the SEL signal on Select line 42 and BSY signal on Busy line 44 may be either differential or single-ended signals as well.

Initiator-to-target control lines 46 interconnect bus initiator interface 20 to bus target interface 26 providing unidirectional control lines for the acknowledge ("ACK"), attention ("ATN") and reset ("RST") signals as shown. Conversely, the target-to-initiator control lines 48 interconnect the bus target interface 26 to the bus initiator interface 20 as well as the switch control logic 28. The target-to-initiator control lines 48 include the unidirectional control lines for the control/data ("C/D"), the input/output ("I/O"), the message ("MSG") and request ("REQ") signals.

With reference to the initiator-to-target control lines 46, the ACK signal is driven by the bus initiator device 12 and comprises a data strobe signal sent in response to the bus target device 14 REQ signal. The ATN signal is driven by the bus initiator device 12 as well and informs the bus target device 14 that the initiator has a message ready and that the target device should switch to the "message" phase. The RST signal may be driven by either the bus initiator device 12 or the target device 14 and comprises a strobe signal that triggers a bus-wide reset of all devices. Usually, only a single device produces a RST signal.

The C/D signal is driven by the bus target device 14 and allows it to select whether it will be transferring a command or data to/from the bus initiator device 12. The I/O signal allows the bus target device 14 to determine whether it will be receiving or sending information along the data bus while the MSG signal (which is driven by the target) allows the bus target device 14 to send coded status or error messages back to the bus initiator device 12 during the "message" portion of the SCSI bus cycle. The REQ signal, driven by the bus target device 14 comprises a data strobe signal which allows a potential initiator device to obtain data on the bus. The SEL signal on Select line 42 may be driven by either the bus initiator device 12 or the bus target device 14 and is a signal used by an initiator in order to select a target device. The BSY signal on Busy line 44 may be driven by either the bus initiator device 12 or the bus target device 14 and allows a device to inform the bus that a device is currently using the bus.

Switch control logic 28 provides a differential driver enable signal on differential driver enable line 50 to the bus initiator interface 20 as well as a pair of enable signals previously denominated as enable signal line 32 in FIG. 1 comprising a single-ended driver enable line 52 and single-ended receiver enable line 54 for controlling bus target interface 26. The bi-directional port busy signal line 30 provides a PORT BUSY (or "PRTBSY") signal to other switching circuits 16 of the multi-port switching system 10 of FIG. 1. Information regarding the identification of the bus target device 14 is provided to the switch control logic 28 on a uni-directional target ID switch line 56. The switch control logic 28 is also coupled to the data/parity signal lines 40, the Select line 42 and Busy line 44.

Referring additionally now to FIG. 3A, the various differential signals supplied to the bus initiator interface 20 of the switching circuit 16 are shown in conjunction with a conventional differential SCSI connector 58. With reference also to FIG. 3B, the signals provided at the output of the bus target interface 26 are shown with respect to a conventional single-ended SCSI connector 60.

With reference additionally now to FIG. 4A, a single latch circuit 62 comprising a portion of the direction control circuit 36 shown in FIG. 2 as well as portions of the bus initiator interface 20 and bus target interface 26 is shown. A corresponding latch circuit 62 will be provided in conjunction with the bus initiator interface 20, the bus target interface 26 and direction control circuit 36 for each of the eight SCSI data lines as well as the ninth parity line. In pertinent part, latch circuit 62 comprises a pair of resistively cross-coupled NOR gates 64 and 66 which may be implemented as a portion of a 74F02 quad two input NOR gate available from National Semiconductor Corporation, 2900 Semiconductor Drive, Santa Clara, Calif. 95051.

NOR gate 64 has as a first input, a given one of the data lines DB0-DBP of data/parity line 72 as well as another input connected to a source of supply voltage on supply voltage line 74. The same data line input on data/parity line 72 is connected to the driver input of transceiver 68, which may, in a preferred embodiment comprise a DS3695 differential line transceiver also available from National Semiconductor Corporation. The output of NOR gate 64 is supplied to the driver enable ("DE") input of transceiver 68 as well as being resistively coupled to input line 78 of NOR gate 66 and the receiver enable ("$\overline{RE}$") input of transceiver 68. As shown, supply voltage line 74 is also resistively coupled to the output of NOR gate 66 appearing on output line 82 and provided as one input to driver 70. In a preferred embodiment, driver 70 may comprise a portion of a 74F38 quad two input buffer also available from National Semiconductor Corporation.

NOR gate 66 has an additional input coupled to a corresponding one of the signals IDB0-IDBP which is also coupled to the output of the receiver of transceiver 68. A signal on ACT1 line 84 is coupled to the remaining input of driver 70 and is supplied to the corresponding driver inputs of the remaining latch circuits 62 associated with the additional data/parity bus lines. Output of driver 70 provides a corresponding one of signals SDB0-SDBP depending on the inputs to the latch circuit 62. The corresponding differential data bus signals are taken at a + line 88 and a − line 90 of transceiver 68.

Referring additionally now to FIG. 4B, a pair of similarly configured latch circuits 92 are shown for use in conjunction with the SEL and BSY signals appearing on Select line 42 and Busy line 44 shown in FIG. 2. The various components utilized, and the configuration of the such components is similar to that utilized with respect to the representative latch circuit 62 shown in FIG. 4A, and the foregoing description thereof shall suffice herefor.

NOR gate 94, in conjunction with NOR gate 96, forms a resistively cross-coupled latch circuit. NOR gate 94 has as inputs a signal on BSY line 102 which also provides an input to the driver portion of transceiver 98. An additional input to NOR gate 94 is received on supply voltage line 74 and the output of NOR gate 94 appearing on output line 106 is resistively coupled to one input of NOR gate 96 on input line 108 as well as to the $\overline{\text{RE}}$ input of transceiver 98. The output of NOR gate 94 is also supplied to the DE input of transceiver 98.

NOR gate 96 also receives as input a signal on FEBUSY line 110 and the output of the receiver portion of transceiver 98. The output of NOR gate 96 on output line 112 is resistively coupled back to the supply voltage line 74 for input to NOR gate 94. The signal appearing on output line 112 is provided as one input to driver 100 in addition to a supply voltage line 114 to produce a signal on SBSY line 116. As shown, the differential output of transceiver 98 may taken on + BSY line 118 and − BSY line 120. In like manner, that portion of latch circuits 92 associated with the signal on select line 42 is shown comprising cross-coupled NOR gates 124 and 126 in conjunction with transceiver 128 and driver 130. Inputs to this portion of latch circuits 92 are taken on SEL line 132 and SELRCV line 134 to produce a signal on SSEL line 136 as well as+SEL line 138 and−SEL 140 as shown.

With respect to the latch circuits 62, 92 illustrated in FIGS. 4A and 4B, it can be seen that each bi-directional SCSI signal is controlled by a reset/set ("RS") latch implemented using resistively cross-coupled NOR gates. These latches individually control the direction of each of these SCSI signals. This function is critical during the SCSI arbitration phase as some signals are being driven by the initiator bus while others are being driven by the target bus. From an idle condition, the signal is not asserted by either the bus initiator device 12 or bus target device 14 and both the initiator and target transceivers are enabled for receive only. When one bus, whether the initiator or the target bus, asserts a signal, the RS latch is set and the other bus is placed in drive mode, the receiver is disabled and the driver is enabled. The latch maintains the direction until the side which initially asserted the signal deasserts the signal. At that time, both sets of transceivers are returned to a receive state. It should be noted, that the foregoing embodiment shows the bus initiator interface 20 as implemented with a differential SCSI design using DS3695 transceiver chips. However, the design can be implemented for a single-ended initiator interface as well using single-ended receivers and drivers such as 74F244 and 74F38 parts, respectively without departing from the principles of the present invention disclosed herein. In addition, the single-ended drivers and receivers for all signals and selective differential drivers can be enabled or disabled by the connection state machine of the switch control logic 28 as will be more fully described hereinafter. The state machine receives inputs from all of the SCSI signals. By monitoring these signals, it can determine when to make or break the switch connections.

With reference additionally now to FIG. 4C, a control circuit 140 for use in conjunction with the initiator-to-target and target-to-initiator control lines 46, 48 is shown. Control circuit 140 receives as an input, a signal on ACT2 line 142 for one input to a number of drivers 144, 146, and 148 which may be constructed utilizing the same 74F38 devices previously described. The signal on ACT2 line 142 is also supplied to the DE input of a number of transceivers 150, 152, 154 and 156, all respectively having their $\overline{\text{RE}}$ input coupled to a source of supply voltage. As shown, transceivers 150, 152, 154 and 156 are utilized in conjunction with the C/D, I/O, REQ and MSG uni-directional control signals respectively as shown. The corresponding differential signals are also furnished as shown.

Transceivers 158, 160 and 162 may also be furnished as DS3695 devices as well as transceivers 150–156. The receiver outputs of transceivers 158, 160, 162 are supplied, respectively, to the remaining inputs of drivers 144, 146 and 148 as shown. Drivers 146 and 148 also have this additional input coupled to the ACK and RST signals, respectively. The differential signals corresponding to the ATN, ACK and RST signals are associated with transceivers 158, 160 and 162.

Referring additionally now to FIG. 4D, a simple oscillator circuit 166 comprising a 32 Mhz clock generator is shown for supplying a CLOCKA signal to the switch control logic 28 as will be more fully described hereinafter.

Referring additionally now to FIG. 4E, a receiver circuit 170 forming a portion of the bus target interface 26 as illustrated in FIGS. 1 and 2 is shown. Receiver circuit 170 comprises a receiver IC 172 and a corresponding edge triggered three state IC 174. Receiver IC 172 may be furnished as a 74F244 device while edge triggered three state IC 174 may be furnished as a 74ALS374 device also available from National Semiconductor Corporation. Receiver circuit 170 is illustrated to depict the interrelationship between the various uni-directional control signals between the bus initiator interface 20 and the bus target interface 26.

With reference additionally now to FIG. 4F, an additional receiver circuit 176 forming a portion of the bus target interface 26 illustrated in FIGS. 1 and 2 is shown. Receiver circuit 176 comprises, in pertinent part, a pair of receiver IC's 178 and 180 which may also be furnished as 74F244 devices. Receiver circuit 176 is illustrated to show the interrelationship between the signals appearing on the SCSI data/parity line 40 in relation to the signal TARGETDIS.

Figure 5:
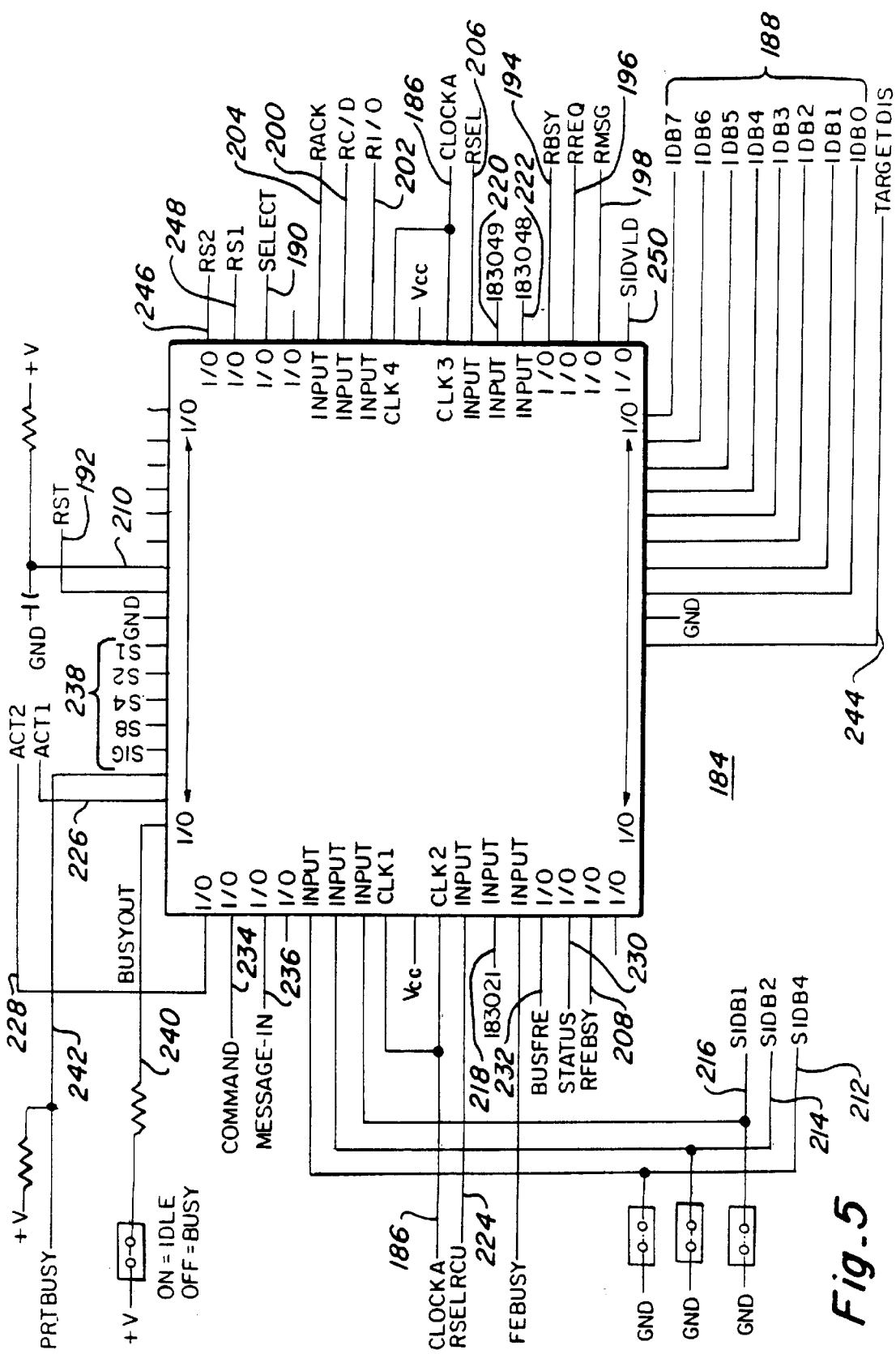
FIG. 5 is a detailed schematic diagram illustrating the signal inputs and outputs to the programmable logic device ("PLD") forming the finite state machine of the switch control logic of the switching circuit illustrated in FIGS. 1 and 2.

With reference additionally now to FIG. 5, the state machine 184 of the switch control logic 28 previously described with respect to FIGS. 1 and 2 is shown in greater detail. State machine 184 may comprise, as shown, an EP1810 Programmable Logic Device ("PLD") available from Altera Corporation, 2610 Orchard Parkway, San Jose, Calif. 95134. The inputs to the state machine 184 are shown in the following Table A. in the format of [signal@PLD pin no./Fig. ref. no.]:

TABLE A

INPUTS

CLK1@17/186, CLK2@19/186, CLK3@51/186, CLK4@53/186,
IDB7@43/188, IDB6@42/188, IDB5@41/188, IDB4@40/188, IDB3@39/188,
IDB2@38/188, IDB1@37/188, IDB0@36/188,
SELECT@58/190, RST@68/192, RBSY@47/194, RREQ@46/196, RMSG@45/198,
RG/D@55/200, RI/O@54/202, RACK@56/204,
RSEL@50/206, RFEBSY@25/208, PURESET@67/210, SIDB4@14/212,
SIDB2@15/214, SIDB1@16/216,
183021@21/218, 183049@49/220, 183048@48/222, RSELRCV@20/224

TABLE B

OUTPUTS

AGT1@8/226, AGT2@10/228,
SELECT@58/190, STATUS@24/230, BUSFRE@23/232, COMMAND@11/234,
MESSAGE-TN@12/236,
S16@6/238, S8@5/238, S4@4/238, S2@3/238, S1@2/238, (selection state bits)
BUSYOUT@9/240, PRTBUSY@7/242, TARGETDIS@34/244,
RS2@60/246, RS1@59/248, (RST detection state bits)
SIDVLD@44/250

Tables C. and D. show, respectively, the network and output configuration conditions for the state machine 184:

TABLE C

NETWORK

| | | | | |
|---|---|---|---|---|
| CLK1 = | INP(CLK1) | | | |
| CLK2 = | INP(CLK2) | | | |
| CLK3 = | INP(CLK3) | | | |
| CLK4 = | INP(CLK4) | | | |
| DB7 = | INP(DB7) | % | LOW ACTIVE | % |
| DB6 = | INP(D136) | % | \| | % |
| DB5 = | INP(DB5) | % | \| | % |
| DB4 = | INP(DB4) | % | \| | % |
| DB3 = | INP(DB3) | % | \| | % |
| DB2 = | INP(DB2) | % | \| | % |
| DB1 = | INP(DB1) | % | \| | % |
| DB0 = | INP(DB0) | % | \| | % |
| RSEL = | INP(RSEL) | % | \| | % |
| RBSY = | INP(RBSY) | % | \| | % |
| RREQ = | INP(RREQ) | % | \| | % |
| RMSG = | INP(RMSC) | % | \| | % |
| RC/D = | INP(RC/D) | % | \| | % |
| RI/O = | INP(RI/O) | % | \| | % |
| RRST = | INP(RRST) | % | \| | % |
| SID2 = | INP(SID2) | % | \| | % |
| SID4 = | INP(SID4) | % | \| | % |
| SID6 = | INP(SID6) | % | \| | % |
| SIDB2 = | INP(SIDB2) | % | \| | % |
| SIDB4 = | INP(SIDB4) | % | LOW ACTIVE | % |
| RSELRCV = | INP(RSELRCV) | % | INIT SELECTION . . . LOW ACTIVE | % |
| FEBSY = | INP(FEBSY) | % | INIT BSY | % |
| PURESET = | INP(PURESET) | % | Low active | % |

TABLE D

OUTPUT CONFIGURATION

| | |
|---|---|
| COMMAND,COMMANDf = | RORF(COMMANDn,CLK1,GND,GND,VCC) |
| MESGIN,MESGINf = | RORF(MESGINn,CLK1,GND,GND,VCC) |
| STATUS,STATUSf = | RORF(STATUSn,CLK2 ,GND,GND,VCC) |
| BUSFRE,BUSFREf = | RORF(BUSFREn,CLK2 ,GND,GND,VCC) |
| SELECT,SELEGTf = | COIF(SELECTn,VCC) |
| PRTBUSY,PRTBUSYf = | COIF(GND,BUSYOUTf) % Low Active /Common Busy% |
| BUSYOUT,BUSYOUTf = | COIF(BUSYOUTn, VCC) |
| AGT1,AGT1f = | COIF(AGT1n,VCC) |
| AGT2,AGT2f = | COIF(AGT2n,VCC) |
| TARGETDIS = | CONF(TARGETDISn,VCC) |
| SIDVLD,SIDVLDf = | RORF(SIDVLDn,CLK3,GND,GND,VCC) |
| RFEBSY,RFEBSYf = | RORF(RFEBSYn,CLK2,GND,GND,VCC) |

The following Table E. illustrates the logic equations for the state machine 184:

TABLE E

LOGIC EQUATIONS

EQUATIONS:

```
RFEBSYn = FEBSY;
TARGETDISn = /( AGT1f);
PROMENABn = VCC;
SELECTn = /RSELRGV * RIO; % Selection Phase %
STATUSn = RMSG * /RGD * /RIO * /RREQ;
BUSFREn = RSELRGV * RBSY * RIO;
COMMANDn = (AGT2f * /RBSY * /RGD * RMSG * RIO );
MESGINn = (/RBSY * /RGD * /RMSG * /RIO * RREQ);
RESET = RM2;      % RESET GENERATED BY THE SGSI_RST STATE
MACHINE %
MRESET = RM2;
AGT1n = ((SM1 + SM2 + SM3 + SM4 + SM5 + SM6 + SM7) * RM0);
% Port Selected %
AGT2n = ((SM2 + SM3 + SM4 + SM5 + SM6 + SM7) * RM0)
    + (PRTBUSYf * /SELEGTf * RM1); % RESET during busfree phase
SIDVLDn = (/51D2 * SIDB4 * /SIDB2 * SELEGTf * FEBSY) %
ID bit 2
%
    + (/51D4 * /SIDB4 * SIDB2 * SELEGTf * FEBSY) %
ID bit 4
%
    + (/51D6 * /SIDB4 * /SIDB2 * SELEGTf * FEBSY); % ID
bit 6
```

Figure 6A:
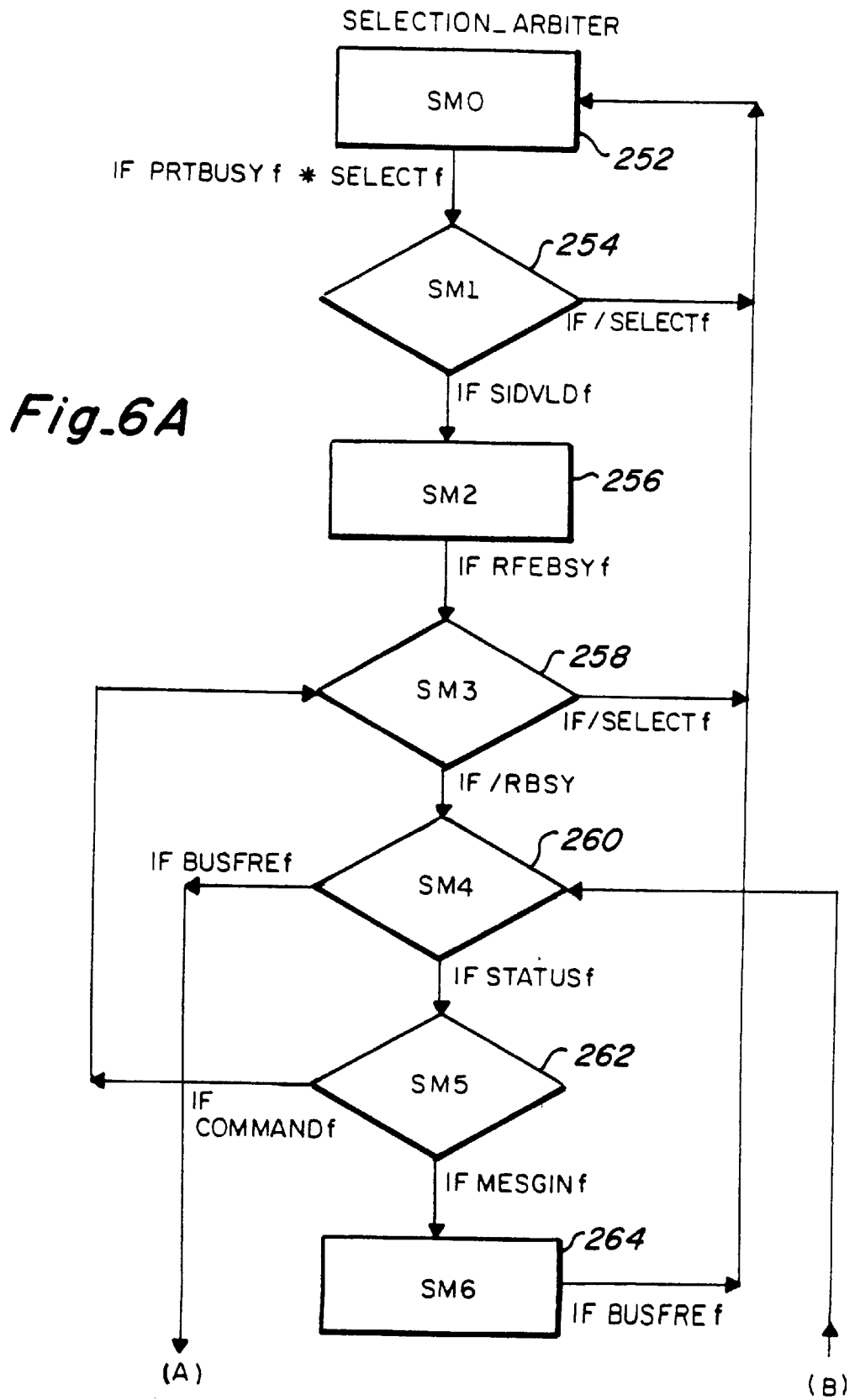
FIGS. 6A and 6B comprise a state diagram of the SELECTION_ARBITER of the switch control logic state machine illustrating the various states thereof.
Figure 6B:
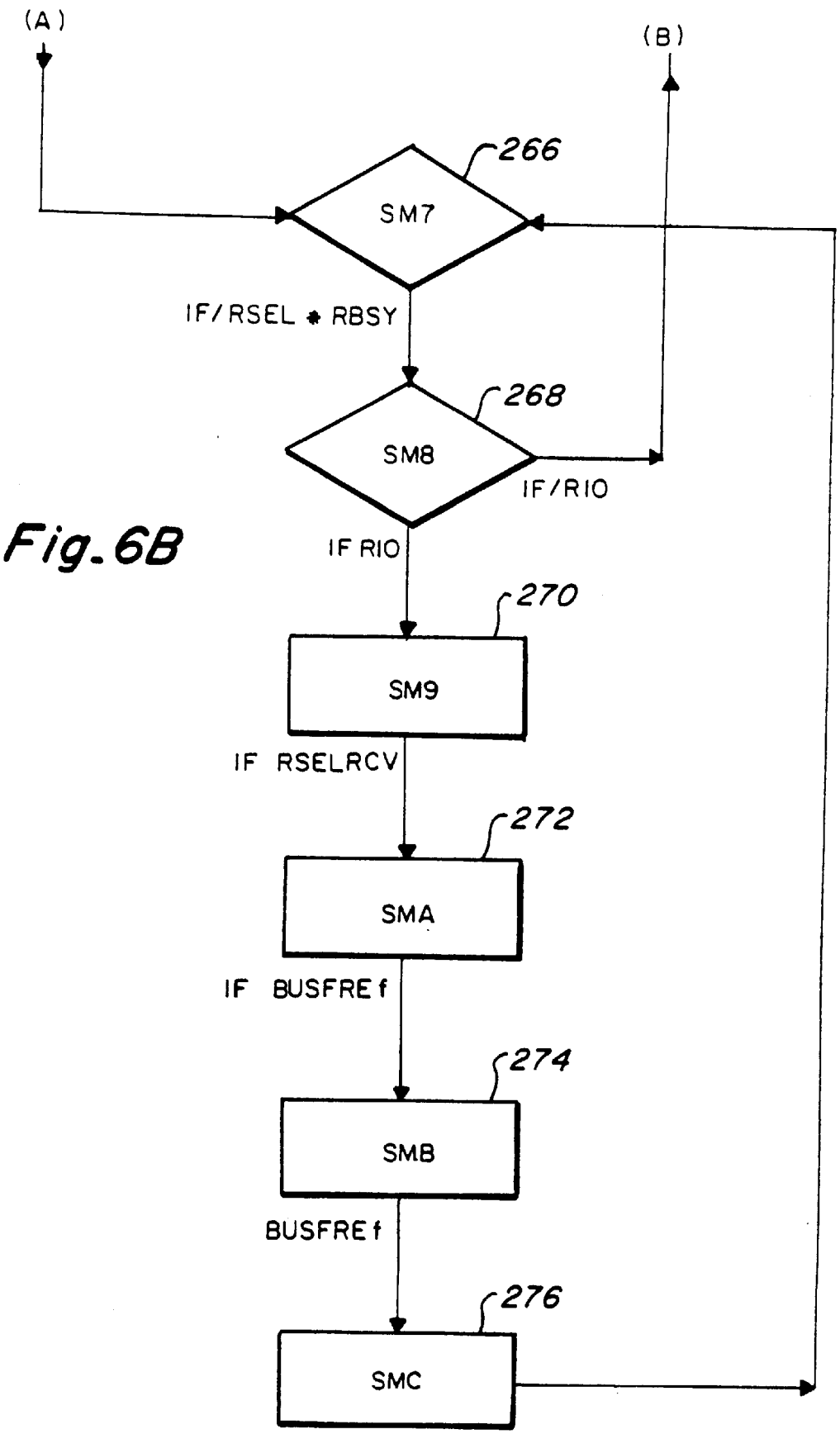

With reference additionally now to FIGS. 6A and 6B, the SELECTION_ARBITER state machine is shown. The various states are denominated SM0 through SMC as shown and are in the format [SMx/Fig. ref. no.] in the following Table F. which correlates the state machine states with the selection state bits 238:

TABLE F

| STATES: | [ | S16 | S8 | S4 | S2 | S1 | ] | |
|---|---|---|---|---|---|---|---|---|
| SM0 | [ | 0 | 0 | 0 | 0 | 0 | ] | % 0 % |
| SM1 | [ | 0 | 0 | 0 | 0 | 1 | ] | % 1 % |
| SM2 | [ | 0 | 0 | 0 | 1 | 1 | ] | % 3 % |
| SM3 | [ | 0 | 0 | 0 | 1 | 0 | ] | % 2 % |
| SM4 | [ | 0 | 0 | 1 | 1 | 0 | ] | % 6 % |
| SM5 | [ | 0 | 0 | 1 | 0 | 0 | ] | % 4 % |
| SM6 | [ | 0 | 1 | 1 | 0 | 0 | ] | % C % |
| SM7 | [ | 0 | 1 | 0 | 0 | 0 | ] | % 8 % |
| SM8 | [ | 1 | 1 | 0 | 0 | 0 | ] | % 18 % |
| SM9 | [ | 1 | 0 | 0 | 0 | 0 | ] | % 10 % |
| SMA | [ | 1 | 1 | 0 | 0 | 1 | ] | % 19 % |
| SMB | [ | 1 | 1 | 1 | 0 | 1 | ] | % 1D % |
| SMC | [ | 1 | 1 | 1 | 0 | 0 | ] | % 1C % |

```
SM0/252:
    IF PRTBUSYf * SELECTf THEN SM1/254
SM1/254:   % check for valid SCSI ID bit %
    IF/SELEGTf THEN SM0/252     % Selection time-out %
    IF SIDVLDf THEN SM2/256     % ID bit ok %
    OUTPUTS:
    BUSYOUTn    % Drive port_busy to other port %
SM2/256:   % SGSI is valid %
    % Wait for Initiator busy to negate . . . %
    % Drive busy, select and ID bits to target %
    IF RFEBSYf THEN SM3/258
    OUTPUTS:
        BUSYOUTn
SM3/258:   % Wait for target to respond %
    IF/RBSY THEN SM4/260    % Target is present %
    IF/SELEGTf THEN SM0/252    % Target not present %
    OUTPUTS:
        BUSYOUTn
SM4/260:   % Wait for STATUS or DISCONNECT %
    IF STATUSf THEN SM5/262
    IF BUSFREf THEN SM7/266 % Target has entered
disconnect-                 phase %
```

TABLE F-continued

| STATES: | [ | S16 | S8 | S4 | S2 | S1 | ] |
|---|---|---|---|---|---|---|---|

```
    OUTPUTS:
        BUSYOUTn
SM5/262:    % Wait for Message_IN %
    IF COMMANDf THEN SM3/258
    IF MESGINf THEN SM6/264
    OUTPUTS:
        BUSYOUTn
SM6/264:
    IF BUSFREf THEN SM0/252
    OUTPUTS:
        BUSYOUTn
% ****************************************************************
% WAIT FOR RECONNECT OR
% WHILE IN DISCONNECT_PHASE, SENSE INITIATOR REQUEST
% ****************************************************************
SM7/266:
    IF/ RSEL * RBSY THEN SM8/268    % Wait for arbitration
                        to complete %
                        % SE bus enabled %
    OUTPUTS:
        BUSYOUTn
SM8/268:    % Wait for selection %
    IF /RIO THEN SM4/260     % SE bus enabled %
    IF RIO THEN SM9/270
    OUTPUTS:
        BUSYOUTn
SM9/270:    % Wait for Initiator's SEL to negate %
    IF RSELRCV THEN SMA/272
    OUTPUTS:
        BUSYOUTn
SMA/272:    % Wait for front_end busy to negate %
    IF BUSFREf THEN SMB/274
    OUTPUTS:
        BUSYOUTn
SMB/274:    % Wait for front_end busy to negate %
    IF BUSFREf THEN SMG/276
    OUTPUTS:
        BUSYOUTn
SMG/276:    % Wait for front_end busy to negate %
    IF BUSFREf THEN SM7/266
    OUTPUTS:
        BUSYOUTn
```

With reference additionally now to FIG. 7, the SCSI_RESET_DETECTION state machine is shown. The various states are denominated RM0 through RM3 as shown and are in the format [RMx/Fig. ref. no.] in the following Table G. which also correlates the state machine 184 states with the RST detection state bits 246,248.

TABLE G

| STATES: | [ | RS2 | RS1 | ] |
|---|---|---|---|---|
| RM0 | [ | 0 | 0 | ] |
| RM1 | [ | 0 | 1 | ] |
| RM2 | [ | 1 | 1 | ] |
| RM3 | [ | 1 | 0 | ] |

```
RM0/280:    % WAIT FOR SGSI RESET TO COME ACTIVE %
    IF RRST THEN RM1
    IF /PURESET THEN RM1    % Power-Up-Reset is active %
RM1/282:    % WAIT FOR SGSI RESET TO COME INACTIVE %
    IF /RRST THEN RM2
RM2/284:    % GENERATE RESET TO ALL STATE MACHINES %
    IF PURESET THEN RM3
RM3/286:    RM0/280    % GO TO IDLE %
END$
```

The state machine 184 receives inputs from all of the SCSI signals. By monitoring these signals, it can determine when to make and break the switch connection as follows:

IDLE:

The state machine 184 waits for select AND DBx AND PORT BUSY. When the SEL signal on select line 42 from the bus initiator device 12 is detected, the data bit which matches the target ID switches on target ID switch line 56 is checked to be active and the PORT BUSY signal from the other switching circuits 16 is checked to be inactive. This condition indicates that the SCSI selection sequence is to the attached bus target device 14 and that the target is not in use by any other switching circuit 16 (or port). Upon meeting these conditions, the state machine 184 goes to the CONNECTED-ACTIVE state.

CONNECTED-ACTIVE:

The state machine 184 enables the single-ended target drivers and asserts the PORT BUSY signal to the other switching circuits 16. The direction of the bi-directional signals is now under control of the RS latch circuits of the direction control circuit 36 as previously described. The selection sequence is propagated to the bus target device 14 and the normal SCSI handshake occurs. The state machine 184 waits for the BUSFRE (bus free) or SCSI STATUS phase. If BUSFRE is detected, the state machine 184 goes to the CONNECTED-INACTIVE state. If the SCSI STATUS is detected, the state machine 184 goes to the STATUS state.

STATUS:

The state machine 184 waits for the BUSFRE or SCSI COMMAND phase. If BUSFRE is detected indicating the end of the SCSI operation, the PORT BUSY signal is deasserted and the state machine 184 returns to IDLE to await the next command. The single-ended drivers are then disabled. If the COMMAND phase is detected, indicating that this was a linked command, the state machine 184 returns to the CONNECTED-ACTIVE state.

CONNECTED-INACTIVE:

This state is entered when the bus target device 14 disconnects before completing the SCSI command. The single-ended drivers remain enabled to allow the bus target device 14 to see the SCSI Busy and data lines for the arbitration phase. The PORT BUSY signal to the other switching circuits 16 remains active. When the state machine 184 sees the bus target device 14 assert SELECT AND I/O it indicates that the attached target has won arbitration and is attempting reselection. The state machine then returns to the CONNECTED-ACTIVE state.

The foregoing is a simplified description of the functionality of the state machine 184 and additional states may be used to wait for certain expected SCSI conditions. A more complete understanding of the operation of the state machine 184 may be had by reference to the foregoing logic equations of Table E. In addition, when SCSI RESET is detected in any state except the IDLE state with the PORT BUSY signal being driven from another switching circuit 16, RESET is propagated to the bus target device 14 and the state machine 184 returns to IDLE.

Figure 8:
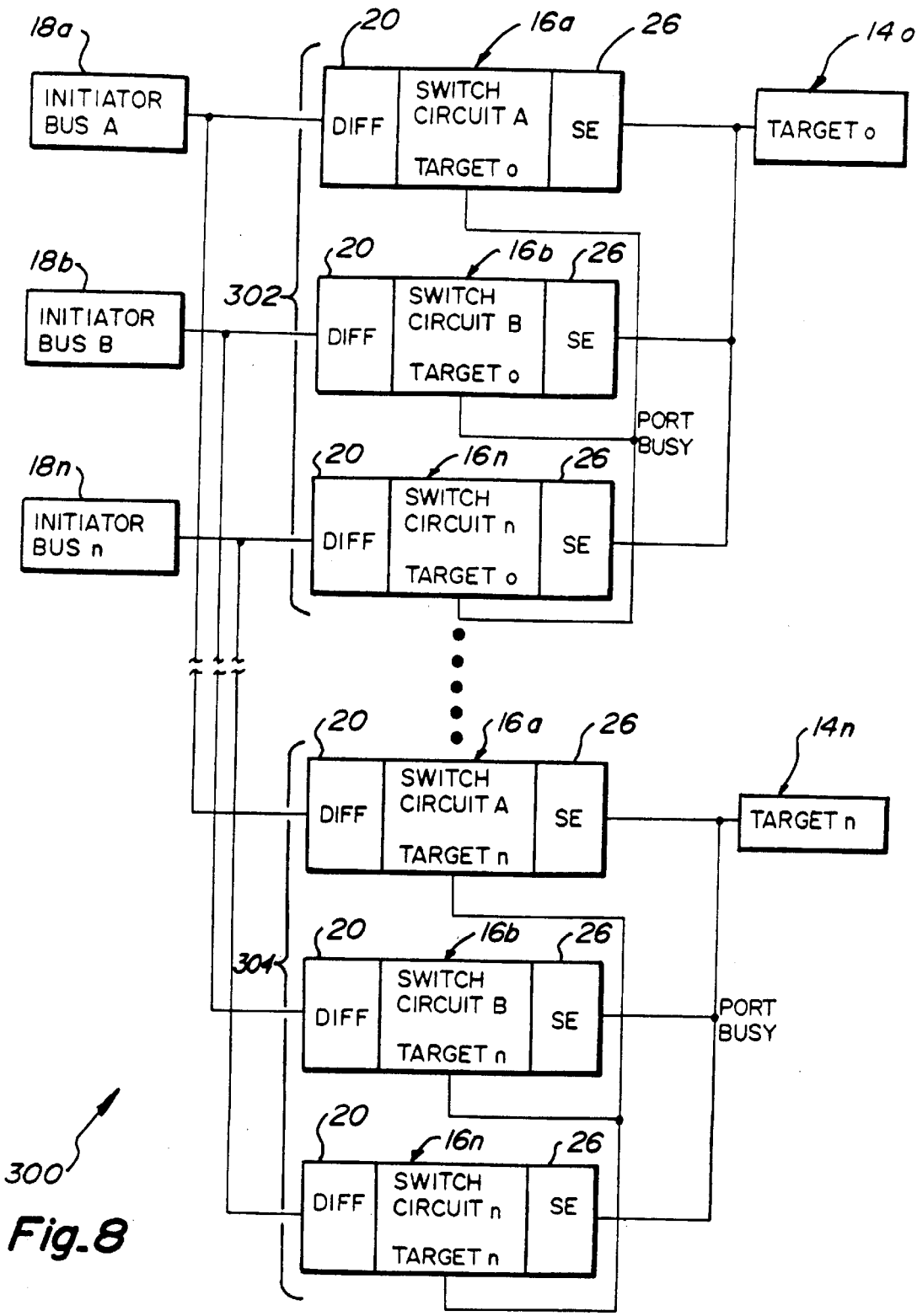
FIG. 8 is an expanded logic block diagram of a possible application of the multi-port switching system for a computer bus incorporating O through n sets of switching circuits for each of A through n initiator busses for selectively coupling the initiator busses to O through n target devices.

With reference additionally to FIG. 8, an expanded logic block diagram of a possible application of the multi-port switching system for a computer bus subsystem 300 is shown. The subsystem 300 incorporates a number of initiator busses 18*a* through 18*n* coupled to n sets of switching circuits (each incorporating switching circuits 16*a* through 16*n*) shown as set 302 associated with bus target device 14$_0$ and set 304 associated with bus target device 14$_n$ for selectively coupling the initiator busses to 0 through n bus target devices. It should be noted that each of the initiator busses 18*a* through 18*n* may have one or more bus initiator devices (not shown) associated therewith.

While the foregoing description has been described with respect to a particular embodiment of the multi-port switching system 10 utilized inc conjunction with fast narrow SCSI, the principles of the present invention are likewise applicable to fast wide SCSI and can be implemented by duplicating the data bit circuits for the additional eight bits. Moreover, while the foregoing description has been described with respect to a bus initiator interface 20 utilizing differential SCSI, the design may also be implemented for a single-ended initiator interface using single-ended receivers.

While there have been described above, the principles of the present invention in conjunction with specific apparatus, it is to be clearly understood that the foregoing description is made only by way of example.

What is claimed is:

1. A multi-port switching system for a computer bus, said multi-port switching system being operative for selectively coupling one of n bus initiator devices to a bus target device, said switching system comprising:

a plurality m of initiator buses, wherein m and n are integers, and wherein n is greater than m, a plurality m of switching circuits, each of said switching circuits having a bus initiator interface that is coupled through an initiator bus to a subset of said n bus initiator devices, each of said switching circuits having a bus target interface that is coupled to said bus target device through said computer bus, each of said switching circuits being responsive to one of said subset of said n bus initiator devices connected to said bus initiator interface for coupling said one bus initiator device to said bus target device by way of said bus target interface and said computer bus; and each of said switching circuits generating a busy signal to a remainder of said other switching circuits while said one bus initiator device is coupled to said bus target device.

2. The multi-port switching system of claim 1 wherein said computer bus is a daisy chain bus.

3. The multi-port switching system of claim 2 wherein said daisy chain bus is a SCSI bus.

4. The multi-port switching system of claim 1 wherein each of said switching circuits includes:

a switch control logic subsystem responsive to an externally supplied busy signal that is received from one of said remainder of switching circuits, said switch control logic subsystem for coupling said bus initiator interface to said bus target interface when said externally supplied busy signal is not asserted, and for isolating said bus initiator interface from said bus target interface when said externally supplied busy signal is asserted.

5. The multi-port switching system of claim 4 wherein said bus initiator interface comprises a differential interface.

6. The multi-port switching system of claim 4 wherein said bus target interface comprises a single ended interface.

7. The multi-port switching system of claim 1 wherein said bus target device comprises a computer mass storage device.

8. In combination:

a first and a second switching circuit, each of said first and second switching circuits having, a bus-initiator-interface coupling the switching circuit to at least one bus-initiator-device;

a bus-target-interface coupling the switching circuit to a target-device by way of a computer bus;

controllable-means operating to selectively connect the bus-initiator-interface to the bus-target-interface;

a control-logic-subsystem having a unidirectional-input responsive to the bus-initiator-interface, having a unidirectional-output for generating an enable-signal to the controllable means, and having a bidirectional-input/output responsive to the bus-initiator-interface for selectively receiving an port-busy-signal or generating a port-busy-signal; and circuit means connecting the bidirectional-input/output of said first switching circuit to the bidirectional-input/output of said second switching circuit, such that an initial one of said first and second switching circuits to receive an input from a bus-initiator-device that is coupled to the bus-initiator-interface of said initial switching circuit operates to couple the bus-initiator-interface to the bus-target-interface of said initial switching circuit, and to provide a port-busy-signal to the other of said first and second switching circuits.

9. claim 8 wherein said bus-initiator-interface comprises a differential interface.

10. claim 8 wherein said bus-target-interface comprises a single ended interface.

11. claim 8 wherein said computer bus is a daisy chain bus.

12. claim 8 wherein said daisy chain bus is a SCSI bus.

13. claim 8 wherein said target-device comprises a computer mass storage device.

14. A method for selectively coupling one of n bus initiator devices to a bus target device through a computer bus comprising the steps of:

providing a plurality of switching circuits, each of said switching circuits being coupled between a subset of said n bus initiator devices and said bus target device;

coupling said one of said n bus initiator devices to said bus target device by enabling a corresponding one of said plurality of switching circuits; and providing generating means within said one of said plurality of switching circuits for generating a busy signal to a remainder of said plurality of switching circuits, to thereby disable said remainder of said plurality of switching circuits, while said one of said plurality of switching circuits is operative to couple said one of said n bus initiator devices to said bus target device.

15. The method of claim 14 wherein said step of providing is carried out by the steps of:

coupling each of said plurality of switching circuits to a different subset of said n bus initiator devices through a bus initiator interface, one bus initiator interface being provided for each switching circuit; and coupling each of said plurality of switching circuits to said bus target device through a bus target interface, one bus target interface being provided for each switching circuit.

16. The method of claim 15 wherein said step of coupling is carried out by the step of:

providing means within each of said plurality of switching circuits for monitoring said generating means within the remainder of said plurality of switching circuits for generation of an externally supplied busy signal;

coupling said bus initiator interface to said bus target interface when an externally supplied busy signal is not asserted by any of said remainder of said Plurality of switching circuits and;

isolating said bus initiator interface from said bus target interface when an externally supplied busy signal is asserted by one of said remainder of said plurality of switching circuits.

* * * * *